Figure 1:
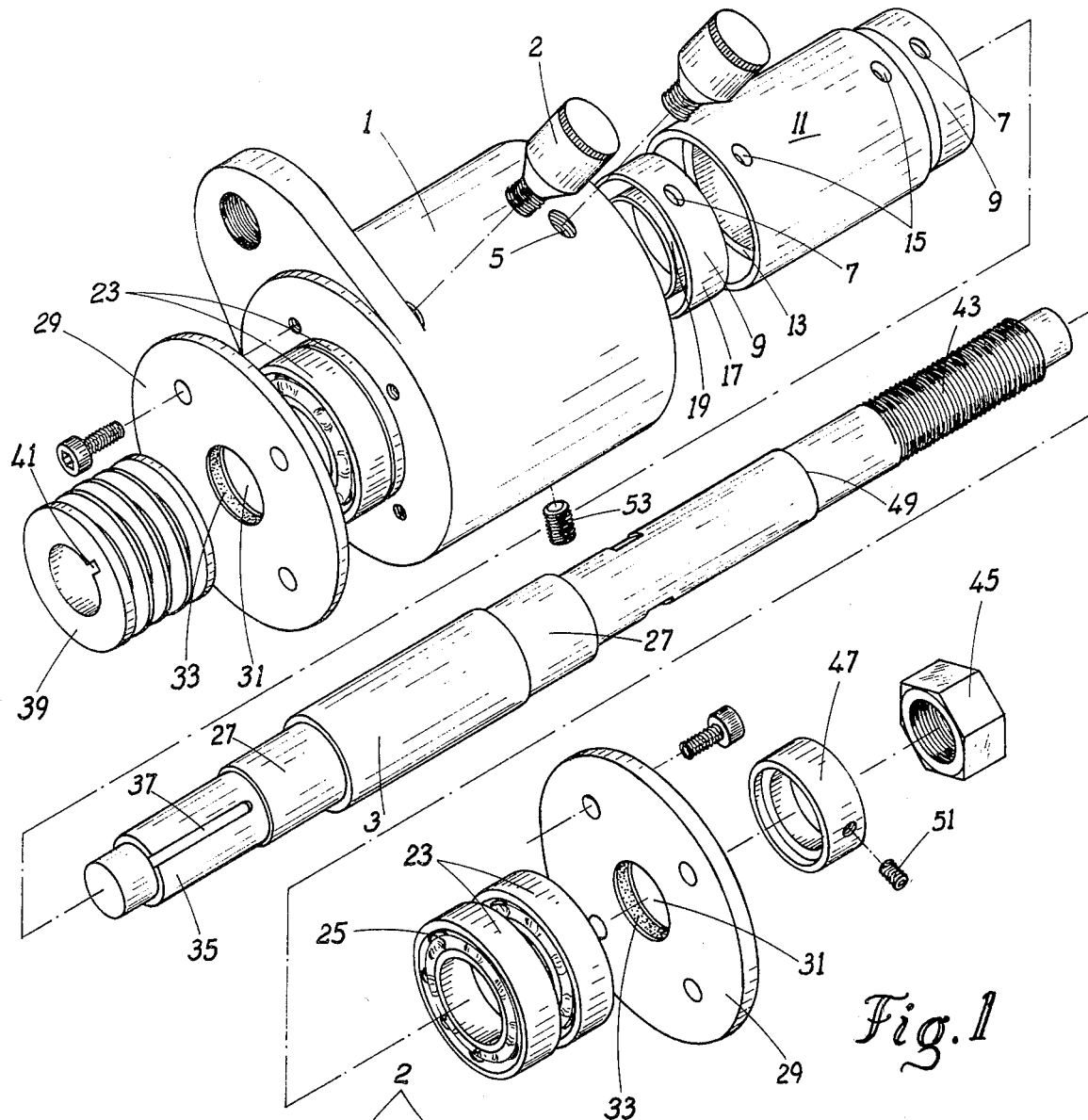

United States Patent [19]
Rhodes

[11] 3,944,026
[45] Mar. 16, 1976

[54] SPINDLE LUBRICATING DEVICE

[76] Inventor: Arthur J. Rhodes, 2601 Benoch Ave., Louisville, Ky. 40216

[22] Filed: June 23, 1975

[21] Appl. No.: 589,132

[52] U.S. Cl. .............................. 184/7 A; 308/240
[51] Int. Cl.² ........................................ F16N 29/00
[58] Field of Search.............. 184/6.14, 7 R, 7 A, 6; 308/100, 121, 123, 187, 240; 57/134; 144/2 R

[56] References Cited
UNITED STATES PATENTS

| | | | |
|---|---|---|---|
| 1,300,023 | 4/1919 | Riegel | 308/240 |
| 2,729,522 | 1/1956 | Bechler | 308/240 |
| 2,952,966 | 9/1960 | Serra | 184/7 A |
| 3,100,375 | 8/1963 | Bourgeas | 57/134 |
| 3,543,879 | 12/1970 | Munn | 184/6.26 |
| 3,797,898 | 3/1974 | Juichi | 308/187 |

Primary Examiner—Richard C. Pinkham
Assistant Examiner—Marvin Siskind

[57] ABSTRACT

A spindle lubricating device including a housing with at least one lubricating opening therein, a pair of bearings having movable members therein disposed within the housing juxtaposed to a pair of lubricating collars, the lubricating collars having openings therein in communication with the lubricating opening in the housing whereby lubrication of the bearings is accomplished by adding lubricant through the lubricating opening in the housing into the opening in the lubricating collar which is also in communication with the movable members of the bearings.

4 Claims, 2 Drawing Figures

U.S. Patent   March 16, 1976   3,944,026

SPINDLE LUBRICATING DEVICE

BACKGROUND OF THE INVENTION

This invention relates to spindle lubricating devices and more particularly to a spindle lubricating device having a new, useful, and unobvious means for lubricating bearings which operate at high speed.

In the operation of rotating shafts at speeds of 5000 to 10,000 revolutions per minute the bearings utilized to operate at these speeds require special care in maintaining proper lubrication in order to prevent wear and tear as well as overheating during the high speed operation. In most operations grease fittings are mounted in housings which contain the bearings and periodically lubricating grease is added directly to the bearings through these fittings. In other operations, oil cups are mounted on the bearing housings and oil is added to the bearings periodically through appropriately aligned openings in the housing with the bearings. However, constant attention is required of these oil cups as filling is required on a regular basis when utilized with bearings turning at high speeds. Thus, means for lubricating bearings which operate at high speed with very little attention and are relatively inexpensive has been sought by manufacturers of high speed machines.

SUMMARY OF THE INVENTION

In the present invention, it is recognized that it is desirable to provide lubricating means for bearings for high speed machines. It is further recognized that it is desirable to provide lubricating means for high speed machines which require very little attention and are relatively inexpensive.

The present invention advantageously provides a straightforward arrangement for a spindle lubricating device which is relatively inexpensive and requires a minimum amount of attention during operation. Even more advantageously, the present invention provides a spindle lubricating device for lubrication of bearings turning at speeds above 5000 revolutions per minute.

Various other features of the present invention will become obvious to those skilled in the art upon reading the disclosure set forth hereinafter.

More particularly, the present invention provides a spindle lubricating device comprising: (a) a housing having at least one lubricating opening therein; (b) a pair of bearings disposed within the housing, the outer periphery of the bearings being in movable contact with an inner surface of the housing; (c) a pair of lubricating collars, each of the collars being of approximately the same outer diameter as the bearings and juxtaposed thereto, the collars having an outer and inner surface with a cavity disposed therebetween, the cavity being in alignment with movable members of the bearings and in fluid communication with the lubricating opening in the housing, the outer surface extending outwardly beyond the inner surface whereby a lubricant added through the lubricating opening flows through the cavity and onto the movable members of the bearings; (d) a spindle co-axially aligned with and disposed through and in contact with the inner surface of the bearings; and (e) means for driving the spindle.

It is to be understood that the description of the examples of the present invention given hereinafter are not by way of limitation. Various modifications within the scope of the present invention will occur to those skilled in the art upon reading the disclosure set forth hereinafter.

Figure 2:
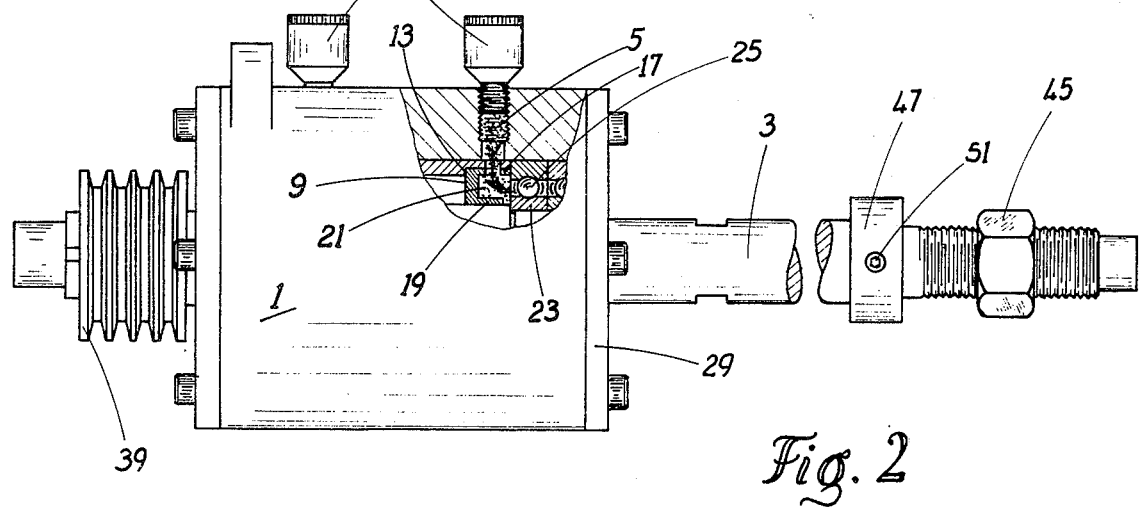

Referring to the drawing:

FIG. 1 is an explosive, perspective view of one spindle lubricating device of the present invention; and, FIG. 2 is an elevational view, partially in cutaway, of the spindle lubricating device of FIG. 1.

FIG. 1 illustrates one preferred embodiment of the present invention comprising a bearing housing 1 with a pair of opposed openings in each end thereof for receiving a shaft or spindle 3 therethrough. Housing 1 is also provided with two flow through openings 5 therein for receiving lubrication grease therethrough from grease cups 2, the openings 5 being in communication with openings 7 in lubricating collars 9. The lubricating collars 9 are disposed within sleeve 11, collar 9 resting against a ledge 13 which is disposed along the outer periphery of sleeve 11 at a preselected distance from each end thereof. Sleeve 11 is further provided with openings 15 therein, openings 15 being in alignment with and disposed between the openings 5 in the housing 1 and the opening 7 in the lubricating collar 9 for providing flow through communication between openings 5 and 7.

The lubricating collar 9 is provided with an outer surface 17 and an inner surface 19 with a cavity 21 disposed therebetween. The outer surface 19 extends a preselected distance outwardly from the inner surface 17, the preselected distance being generally about 0.002 inches. The outer surface 19 is juxtaposed with the outer race of a bearing 23. The cavity 21 is axially aligned with the movable members of the bearing 23, which is shown as balls 25 whereby lubrication flows through the openings 5, 15 and 7, respectively, and into the cavity 21 to provide lubrication of the balls 25 as they rotate. The bearings 23 are disposed along the shaft 3 at the positions noted by the numeral 27, the bearings 23 being movably mounted thereto.

It is realized that roller bearings may also be utilized but the preferred bearings are radial thrust angularly contact ball bearings on high speed spindles. It is also realized that the sleeve 11 and lubricating collars 9 could be of unitary construction as opposed to the three piece construction as described above.

Opposed flanges 29 are provided for each end of the housing 1 for maintaining the bearings in their proper position along the shaft 3. Flanges 29 are adjacent to and in communication with the bearing 23 in oder to provide support for the bearings 3 upon their rotational movement. Flange 29 is further provided with an opening 31 therein, opening 31 having a diameter slightly larger than the diameter of the shaft 3 passing through the opening 31. Along the inner periphery of the opening 31 is a strip of felt 33, the strip of felt 33 being provided to allow excess grease from the bearings to pass or escape from the housing 1.

The shaft 3 is provided with a pulley receiving portion 35 including a keyway 37 therein to receive a pulley 39 thereon, pulley 39 having a keyway 41 for alignment with the keyway 37. The pulley 39 is in communication with a pulley driving motor means (not shown) which may be of any type known in the art and is therefore not discussed.

At the opposite end of the shaft or spindle 3 is a threaded portion 43 adapted to receive a nut 45 thereon and a collar 47 which is disposed to be received by the shaft 3 at the off-set designated by the numeral 49. In high speed operation a grinding wheel, polishing wheel or the like may be inserted over the shaft 3 and held in place by the collar 47 and the adjustable nut 45, the collar 47 being held in place by set screw 51.

A set screw 53 is also provided to be inserted through the housing 1 to hold the sleeve 11 in place.

In operation, grease cups 2 are provided for supplying lubricating grease to the bearings 23 whereby upon turning the grease cups approximately one quarter of a turn once or twice per month lubrication is sufficiently added through the housing and into the lubricating collar and subsequently into the bearings thereby requiring very little attention and maintenance of lubrication of these bearings which are utilized at high speeds. It is realized that grease fittings or other lubricating means may also be inserted through the housing or mounted to the housing 1 without departing from the scope and spirit of the present invention.

Thus, it will be realized that various changes may be made to the specific embodiment shown and described without departing from the scope and spirit of the present invention.

What is claimed is:

1. A spindle lubricating device comprising:
   a. a housing having at least one lubricating opening therein;
   b. a pair of bearings disposed within said housing, the outer periphery of said bearings being in movable contact with an inner surface of said housing;
   c. a pair of lubricating collars, each of said collars being of approximately the same outer diameter as said bearings and juxtaposed thereto, said collars having an outer and inner surface with a cavity disposed therebetween, said cavity being in alignment with movable members of said bearings and in fluid communication with said lubricating opening, said outer surface extending outwardly beyond said inner surface whereby lubricants added through said lubricating opening flow through said cavity and onto said movable members of said bearings;
   d. a spindle co-axially aligned with and disposed through and in contact with the inner surface of said bearings; and,
   e. means for driving said spindle,
   f. a sleeve which is disposed between and which receives said lubricating collars at each end thereof, said sleeve having a pair of openings therein, each opening being in alignment with said cavity in said lubricating collars and said lubricating openings in said housing.

2. The spindle lubricating device of claim 1 wherein said spindle turns at speeds of at least 5000 revolutions per minute.

3. The spindle lubricating device of claim 1 wherein said movable members of said bearings are balls.

4. The spindle lubricating device of claim 1 wherein said movable members of said bearings are rollers.

* * * * *